United States Patent [19]

Yukawa et al.

[11] Patent Number: 5,587,426
[45] Date of Patent: * Dec. 24, 1996

[54] PROCESS FOR PREPARING SELF-CROSSLINKING RESIN

[75] Inventors: Yoshiyuki Yukawa, Hiratsuka; Motoshi Yabuta, Hadano; Akimasa Nakahata, Hiratsuka; Yoh Sugimura, Odawara, all of Japan

[73] Assignee: Kansai Paint Company, Limited, Amagasaki, Japan

[ * ] Notice: The term of this patent shall not extend beyond the expiration date of Pat. No. 5,414,055.

[21] Appl. No.: 24,774

[22] Filed: Mar. 2, 1993

[30] Foreign Application Priority Data

Mar. 4, 1992 [JP] Japan ................................. 4-047189

[51] Int. Cl.$^6$ ............................................. C08G 18/62
[52] U.S. Cl. .................... 525/124; 525/123; 525/453; 525/217; 525/384; 525/77; 525/328.2; 525/374; 525/383; 528/45; 526/310; 526/312; 252/182.2
[58] Field of Search ................................ 525/123, 124, 525/453, 217, 77, 328.2, 374, 383, 384; 528/45; 526/310, 312; 252/182.2

[56] References Cited

U.S. PATENT DOCUMENTS

| | | | |
|---|---|---|---|
| 4,743,653 | 5/1988 | Numata et al. | 525/125 |
| 4,797,449 | 1/1989 | Nakayama et al. | 525/217 |
| 4,829,120 | 5/1989 | Yabata | 525/450 |
| 5,116,930 | 5/1992 | Yabuta et al. | 528/45 |
| 5,124,399 | 6/1992 | Yabuta et al. | 528/45 |
| 5,233,003 | 8/1993 | Lucas et al. | 528/45 |
| 5,274,045 | 12/1993 | Yukawa et al. | 525/293 |
| 5,288,803 | 2/1994 | Yukawa et al. | 525/124 |

FOREIGN PATENT DOCUMENTS

| | | |
|---|---|---|
| 0445739 | 9/1991 | European Pat. Off. . |
| 2460785 | 7/1976 | Germany . |
| 3245296 | 6/1984 | Germany . |
| 3501493 | 7/1986 | Germany . |

OTHER PUBLICATIONS

Derwent Abstract of JP-A-63 186 722, Aug. 2, 1988.

*Primary Examiner*—Rachel Gorr
*Attorney, Agent, or Firm*—Armstrong, Westerman, Hattori, McLeland & Naughton

[57] ABSTRACT

The present invention provides:
(1) a self-crosslinking resin (I) having a blocked isocyanate group and a hydroxyl group in the molecule and characterized in that the resin is prepared from a vinyl polymer (A) having at least two free isocyanate groups in the molecule and an acrylic resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups, and
(2) a self-crosslinking resin (II) having a blocked isocyanate group and a hydroxyl group in the molecule and characterized in that the resin is prepared from a vinyl polymer (C) having a free isocyanate group and a blocked isocyanate group in the molecule and the acrylic resin (B) having at least two hydroxyl groups in the molecule by reacting some of the hydroxyl groups of the resin (B) with all the free isocyanate groups of the polymer (C).

10 Claims, No Drawings

PROCESS FOR PREPARING SELF-CROSSLINKING RESIN

The present invention relates to novel self-crosslinking resins having within the molecule a blocked isocyanate group and a hydroxyl group which are reactive groups complementary to each other.

Two-pack or single-pack coating compositions wherein acryl polyol or like hydroxyl-containing polymer is cured with an isocyanate crosslinking agent produce cured coatings which are excellent in chemical resistance, physical properties, weather resistance, etc. and are therefore in wide use, for example, as motor vehicle coating compositions.

However, the two-pack composition has problems as to safety and hygiene when the isocyanate crosslinking agent is admixed with the other component or when the composition is applied, and further has the drawback that the coating preparation obtained by mixing the two components together has a short pot life before application, becomes viscous during coating operations and presents difficulty in cleaning the coating device. Single-pack coating compositions incorporating a blocked isocyanate crosslinking agent require a baking temperature usually of at least 150° C. because the blocking agent has a high dissociation temperature.

The single-pack composition has the drawback of being not always satisfactory in the compatibility of the crosslinking agent, i.e., blocked isocyanate, with the acryl polyol serving as the base resin, such that even if they are compatible, the cured coating formed differs in composition between the surface and the interior when observed microscopically and is low in curability, gloss and surface smoothness.

To overcome these drawbacks, Unexamined Japanese Patent Publication No. 186722/1988 discloses a self-crosslinking resin which is prepared by copolymerizing a polymerizable monomer containing an isocyanate group or such a monomer as blocked with a polymerizable monomer containing a hydroxyl group to introduce the complementary reactive groups into the molecule.

Nevertheless, preparation of the disclosed resin involves problems. When a radically polymerizable monomer containing an unblocked isocyanate group is copolymerized with a hydroxyl-containing radically polymerizable monomer as disclosed in the publication, it is difficult to prevent the reaction between the isocyanate group and the hydroxyl group even if the copolymerization reaction is conducted at the lowest possible temperature, with the result that gelation is liable to occur during the reaction. The polymerization reaction has other problems with respect to initiators. Since the isocyanate-containing monomer is a derivative of α-methylstyrene according to the publication, azo polymerization initiators fail to achieve a sufficient polymerization conversion, whereas peroxide or carbonate initiators, if used, require a temperature of at least 100° C. for the polymerization when a high conversion of polymerization is to be attained.

On the other hand, gelation is less likely to occur during the polymerization reaction when blocked isocyanate-containing polymerizable monomers are used. However, especially when the polymerizable monomer used contains an isocyanate group blocked with a phenol or oxime blocking agent, there arises a need to conduct the reaction at a relatively high temperature (120° to 140° C.), which entails the drawback of seriously coloring the product. If other blocking agents are used, a higher dissociation temperature will result, so that the self-crosslinkable resin obtained requires heating at a high temperature (at least 170° C.) for curing. When heated at a low temperature (e.g. up to 120° C.), the resin will not always be cured satisfactorily.

An object of the present invention is to provide a novel self-crosslinking resin which can be prepared by a reaction without entailing gelation, coloration and a reduction in polymerization conversion.

Another object of the invention is to provide a self-crosslinking resin having a blocked isocyanate group and a hydroxyl group in the molecule and usable to provide single-pack compositions which are at least comparable to conventional two-pack compositions in coating properties and which can be handled and usable for coating without any cumbersomeness unlike two-pack coating compositions and can be made curable at a low temperature.

These and other objects of the present invention will become apparent from the following description.

The present invention provides:

(1) a self-crosslinking resin (I) having a blocked isocyanate group and a hydroxyl group in the molecule and characterized in that the resin is prepared from a vinyl polymer (A) having at least two free isocyanate groups in the molecule and an acrylic resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups, and (2) a self-crosslinking resin (II) having a blocked isocyanate group and a hydroxyl group in the molecule and characterized in that the resin is prepared from a vinyl polymer (C) having a free isocyanate group and a blocked isocyanate group in the molecule and the acrylic resin (B) having at least two hydroxyl groups in the molecule by reacting some of the hydroxyl groups of the resin (B) with all the free isocyanate groups of the polymer (C).

The self-crosslinking resins (I) and (II) of the present invention will be described in greater detail.

The self-crosslinking resin (I) has a blocked isocyanate group and a hydroxyl group in the molecule and is prepared from a vinyl polymer (A) having at least two free isocyanate groups in the molecule and an acrylic resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups.

Stated more specifically, the vinyl polymer (A), which has at least two free isocyanate groups in the molecule, is a polymer consisting essentially of an isocyanate-containing vinyl monomer (hereinafter referred to as the "NCO-containing monomer"), and further comprising other vinyl monomer when required. The polymer is a straight-chain polymer chiefly having terminal and/or side chain isocyanate groups.

The NCO-containing monomer is a compound having at least one unblocked isocyanate group and at least one radically polymerizable double bond in the molecule. Examples of such compounds are methacryloyl isocyanate, 2-isocyanate ethyl methacrylate, m- or p-isopropenyl-α,α-dimethylbenzyl isocyanate and addition product of a hydroxyl-containing vinyl monomer with a diisocyanate compound in the mole ratio of 1:1. One or at least two of these compounds are usable.

The hydroxyl-containing vinyl monomer for use in preparing the NCO-containing monomer is a compound having at least one hydroxyl group and at least one radically polymerizable double bond in the molecule. Exemplary of such compounds are 2-hydroxyethyl (meth)acrylate, 2-hydroxypropyl (meth)acrylate, hydroxybutyl acrylate, 2,3-dihydroxypropyl acrylate, 2-hydroxy-3-phenoxyethyl acrylate, 2-hydroxy-3-ethoxyethyl acrylate and the like. Also usable is an equimolar adduct of acrylic acid or methacrylic acid with a glycol (having 2 to 20 carbon atoms).

The diisocyanate compound to be used for preparing the NCO-containing monomer is a compound having two isocyanate groups in the molecule. Examples of such compounds are aliphatic, aromatic and alicyclic diisocyanate compounds including tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4(2,6)-diisocyanate, isophorone diisocyanate and trimethylhexane diisocyanate.

Preferable among these NCO-containing monomers are 2-isocyanate ethyl methacrylate, m-isopropenyl-$\alpha,\alpha'$-dimethylbenzyl isocyanate and equimolar adduct of 2-hydroxyethyl acrylate with isophorone diisocyanate.

The vinyl polymer (A) is obtained by polymerizing such an NCO-containing monomer only, or copolymerizing the monomer with other vinyl monomer.

Although the NCO-containing monomer to be used can be one of the above examples, it is especially desirable to use m-isopropenyl-$\alpha,\alpha'$-dimethylbenzyl isocyanate having a tertiary isocyanate group from the viewpoint of preventing gelation in the reaction of the polymer (A) with the hydroxyl-containing acrylic resin (B) to be described below.

The other vinyl monomer is preferably a compound having a radically polymerizable double bond in the molecule but not having active hydrogen reactive with the isocyanate group. Examples of such compounds are styrene, $\alpha$-methylstyrene, vinyltoluene and like aromatic vinyl monomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; Viscose 3F (brand name, product of Osaka Organic Chemical Industry, Ltd., the same as hereinafter), Viscose 3MF, 8F and 8MF, perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-dimethylaminoethyl (meth)acrylate, N,N'-diethylaminoethyl (meth)acrylate, N,N'-diethylaminopropyl (meth)acrylate, N,N'-diethyl (meth)acrylamide and like nitrogen-containing vinyl monomers; vinyl ethyl ether, vinyl butyl ether and like vinyl ether monomers; and glycidyl (meth)acrylate, 3,4-epoxycyclohexylmethyl (meth)acrylate, arylglycidyl ether, alkyletherified methylolacrylamide, (meth)acrylamide, (meth)acrylic acid chloride, vinyl chloride, vinylidene chloride, (meth)acrylonitrile, $\gamma$-methacryloxyalkyltrimethoxysilane, etc. These compounds are used singly, or at least two of them are used in admixture.

The ratio of the NCO-containing monomer to the other vinyl monomer is not limited specifically insofar as the resulting polymer (A) has at least two free insocyanate groups in the molecule. The ratio of NCO-containing monomer/other vinyl monomer (by weight) is suitably 100/0 to 1/99, preferably 65/35 to 30/70.

The polymerization reaction of the NCO-containing monomer only or of this monomer with other vinyl monomer is usually conducted preferably in an inert organic solvent free from active hydrogen reactive with isocyanate groups. Examples of useful inert organic solvents are hexane, heptane, octane and like aliphatic hydrocarbons, benzene, toluene, xylene and like aromatic hydrocarbons, esters, ketones, etc. These solvents are used singly or in admixture. These solvents are likely to contain water, which is therefore preferably removed as required.

The polymerization reaction is conducted usually at a temperature of 50° to 180° C. in the presence of a radical polymerization initiator. The molecular weight of the polymer (A) is adjustable, for example, by varying the concentration of the reaction system or the amount of initiator. The concentration of the reaction system is in the range of 20 to 80 wt. % calculated as the polymer. To achieve an improved polymerization conversion, it is especially desirable to use a peroxide or carbonate initiator and conduct the reaction at a temperature of at least 100° C. It is more preferable to use an acrylate monomer in combination with the above monomer or monomers, whereby the polymer can be obtained with ease at a higher polymerization conversion. Although the polymerization initiator is usable at a concentration of 0.01 to 15 wt. % based on the whole amount of monomer or monomers, the concentration is preferably in the range of 0.1 to 10 wt. %.

For the polymerization, an electron beam, ultraviolet rays or the like can be used alternatively instead of the polymerization initiator.

Besides radical polymerization, ion polymerization or group transfer polymerization can be resorted to.

The polymer (A) for use in the present invention is preferably 500 to 50000, more preferably 1500 to 30000, in weight average molecular weight. To be suitable, the polymer is 30 to 200 g/kg in isocyanate value.

The polymer (A), which has at least two free isocyanate groups in the molecule, is preferably free from any active hydrogen reactive with the isocyanate groups.

The acrylic resin (B) is an acrylic resin having at least two hydroxyl groups in the molecule. The acrylic resin (B) is a polymer consisting essentially of a monomer having at least one hydroxyl group and at least one polymerizable double bond in the molecule (hereinafter referred to as the "hydroxyl-containing monomer") and further comprising other vinyl monomer when so required, but containing no NCO-containing monomer.

Examples of useful hydroxyl-containing monomers are hydroxy (meth)acrylic esters such as 2-hydroxyethyl (meth)acrylate, 2-hydroxypropyl (meth)acrylate, hydroxybutyl acrylate, 2,3-dihydroxypropyl acrylate, 2-hydroxyl-3-phenoxyethyl acrylate and 2-hydroxy-3-ethoxyethyl acrylate. Also useful are equimolar adducts of acrylic acid or methacrylic acid with a glycol (with 2- to 20 carbon atoms), caprolactone-modified (meth)acrylic acid ester such as Placcel FM-1 (brand name, product of Daicel Chemical Industries Ltd., the same as hereinafter), Placcel FM-2, FM-3, FM-4, FM-5, FA-1, FA-2, FA-3, FA-4 and FA-5, etc.

Other monomers copolymerizable with the hydroxyl-containing monomer are preferably compounds having a radically polymerizable double bond in the molecule but not having any active hydrogen reactive with the isocyanate group, preferred examples being other vinyl monomers mentioned for the preparation of the vinyl polymer (A). Also copolymerizable as required are carboxyl-containing vinyl monomers or vinyl monomers containing a carboxylic anhydride group, such as acrylic acid, methacrylic acid, crotonic acid, maleic acid, maleic anhydride, iraconic acid, itaconic anhydride, fumaric acid, citraconic acid and like $\alpha,\beta$-ethylenically unsaturated carboxylic acids.

Some or all of the monomers useful for preparing the acrylic resin (B) are acrylic monomers.

Although the proportions of monomers for forming the acrylic resin (B) are not limited specifically, the monomer composition to be used preferably comprises 1 to 100 wt. %, more preferably 10 to 60 wt. %, of the hydroxyl-containing monomer, 0 to 20 wt. %, more preferably 0 to 5 wt. %, of the vinyl monomer containing a carboxyl group or carboxylic anhydride group and 0 to 99 wt. %, more preferably 20 to 90 wt. %, of other vinyl monomer, based on the whole amount of the composition.

The acrylic resin (B) can be prepared by radical polymerization using a polymerization initiator, photopolymerization using an electron beam, ultraviolet rays or the like, ion polymerization or group transfer polymerization as already exemplified for the preparation of the polymer (A). The organic solvent to be used for the polymerization reaction is usually preferably an inert organic solvent free from any active hydrogen reactive with the isocyanate group. Examples of suitable solvents are those exemplified for the preparation of the polymer (A). Also suitable are hydrophilic or water-soluble solvents free from active hydrogen, such as diethylene glycol dimethyl ether, ethylene glycol dimethyl ether and the like.

On the other hand, in the case where the hydroxyl-containing acrylic resin (B) is prepared in an organic solvent having active hydrogen, the reaction mixture can be distilled in a vacuum, concentrated or spray-dried to remove the organic solvent and thereafter used for urethanation reaction with the polymer (A).

The acrylic resin (B) is preferably 500 to 50000, more preferably 2000 to 35000, in weight average molecular weight. To be especially suitable, the hydroxyl content of the resin is 20 to 200 in terms of hydroxyl value.

The reaction between the vinyl polymer (A) and the hydroxyl-containing resin (B) for preparing the self-crosslinking resin (I) is a urethanation reaction between the isocyanate group and the hydroxyl group. Stated more specifically, the urethanation reaction is conducted by admixing the hydroxyl-containing acrylic resin (B) with an organic solvent solution of the vinyl polymer (A) and heating the mixture usually at a temperature of 20° to 100° C., preferably 25° to 60° C. The reaction is controlled with reference to the reduction in the amount of isocyanate group, i.e., isocyanate value. When required, tin or like catalyst may be used for this reaction. The amount of the hydroxyl-containing acrylic resin (B) to be admixed with the vinyl polymer (A) is such that the vinyl polymer (A), when having a weight average molecular weight of 500 to 50000, can be given at least 0.1 urethane bond as introduced therein per molecule. The number of urethane bonds to be introduced into the polymer (A) is preferably 0.5 to 1.5, most preferably 1, per molecule when the polymer has a weight average molecular weight of 500 to 30000.

Thus, the vinyl polymer (A) has the hydroxyl-containing resin (B) added thereto and urethane bonds introduced therein by the reaction of the resin (B) with the polymer (A). The free isocyanate groups remaining in the vinyl polymer (A) are then reacted with a blocking agent and thereby completely blocked to obtain the self-crosslinking resin (I). Examples of useful blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenols; methanol, ethanol, propanol, butanol, ethylene glycol, methyl cellosolve, butyl cellosolve, methyl carbitol, benzyl alcohol, phenyl cellosolve, furfuryl alcohol, cyclohexanol and like alcohols; dimethyl malonate, ethyl acetoacetate and like active methylene compounds; butyl mercaptan, thiophenol, tert-dodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, acetoxime, methyl ethyl ketoxime, methyl isobutyl ketoxime, cyclohexanoneoxime and like oximes; sodium bisulfite, potassium bisulfite and like sulfites; ε-caprolactam, δ-valerolactam, γ-butyrolactam, β-propiolactam and like lactams; etc. Especially preferable among these examples are phenol, lactam, alcohol and oxime blocking agents, while oxime blocking agents are most preferable in the case where baking at a low temperature (up to 120° C.) is required.

As a rule, it is desirable to use the blocking agent in an amount necessary to react with all the remaining free isocyanate groups.

The reaction between the blocking agent and the polymer (A) having the hydroxyl-containing acrylic resin (B) added thereto is conducted usually at a temperature of 20° to 100° C. When required, a tin catalyst or the like may be used.

The self-crosslinking resin (II) has a blocked isocyanate group and a hydroxyl group in the molecule and is prepared from a vinyl polymer (C) having a free isocyanate group and a blocked isocyanate group in the molecule and the acrylic resin (B) having at least two hydroxyl groups by reacting some of the hydroxyl groups in the resin (B) with all the free isocyanate groups in the polymer (C).

More specifically, the vinyl polymer (C), which has a free isocyanate group and a blocked isocyanate group in the molecule, is obtained by reacting a blocking agent with some of the free isocyanate groups in the vinyl polymer (A).

The blocking agent is admixed with the polymer (A) in an amount required to allow free isocyanate groups to remain in the polymer in such an amount that the subsequent reaction with the hydroxyl-containing acrylic resin (B) will introduce approximately the same amount of urethane bonds into the polymer (A) as in the case of the self-crosslinking resin (I). It is especially desirable to use and react the blocking agent in an amount which allows free isocyanate groups to remain in such an amount that one urethane bond can be introduced into the polymer (A) per molecule thereof and which is needed to completely block the other free isocyanate groups.

Some of the hydroxyl groups in the hydroxyl-containing acrylic resin (B) are then reacted with all the remaining free isocyanate groups in the polymer (C) which is prepared by reacting the blocking agent with the polymer (A), whereby the self-crosslinking resin (II) is obtained. Thus, it is required that the amount of hydroxyl groups in the resin (B) be larger than that of remaining free isocyanate groups.

The reaction of the blocking agent with the polymer (A) and the reaction of the resin (B) with the polymer (C) for preparing the self-crosslinking resin (II) are carried out in the same manner as those already described for the self-crosslinking resin (I).

With the self-crosslinking resins (I) and (II) of the present invention, the blocked isocyanate-containing resin molecule and the hydroxyl-containing acrylic resin molecule are linked by a urethane bond formed by the reaction of the isocyanate group with the hydroxyl group. Accordingly, these resins are graft polymers of both resin molecules.

The resins thus obtained have at least one blocked isocyanate group and at least one hydroxyl group, and are preferably about 1000 to about 120000, more preferably about 5000 to about 50000, in weight average molecular weight.

When the self-crosslinking resins of the invention are adapted to have equal amounts of blocked isocyanate and hydroxyl in the molecule, these resins produce self-crosslinking coatings having the highest degree of crosslinking. For use in coating compositions and the like, however, it is desired that either one of the functional groups be present in excess in view of adhesion to substrates and adjoining layers. To be suitable, the resins are about 25 to about 250 in hydroxyl value (mg KOH/g resin) and about 5 to about 250 in isocyanate value (g/1000 g resin).

The term "isocyanate value" as used herein refers to the content of free isocyanate groups in the resin. However, with resins having blocked isocyanate groups, these isocyanate groups are taken as unblocked in determining the isocyanate value.

The self-crosslinking resins of the invention can be dissolved or dispersed in organic solvents for use as coating compositions, adhesive compositions, printing inks, etc.

When the present resin is to be used as a coating composition or the like, coloring pigments, metallic pigments, fillers, curing catalysts, surface conditioning agents, deterioration preventing agents, etc. are added to the resin as required to prepare a single-pack coating composition for use. Also usable with the present resin are other ingredients including polyols, reactive diluents and other crosslinking agents (e.g., melamine resin, blocked isocyanates, and epoxy, acid, alkoxysilane and like compounds).

Examples of useful curing catalysts are tetraisopropyl titanate, tetrabutyl titanate, lithium acetate, iron (III) acetylacetonate, zinc 2-ethylhexonate, copper acetate, vanadium trichloride, tin octylate, dibutyltin diacetate, dibutyltin dioctoate, dibutytin dilarurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-n-butyl-1,3-dilauryloxydistannoxane and like metal catalysts. These metal catalysts may be used singly, or at least two of them are usable in admixture. Also preferably usable are tertiary amines such as trimethylamine, triethylamine, dimethylcyclohexylamine, N-tetramethylhexane-1,6-diamine, N-pentamethyldiethylenetriamine and 2-methyl-1,4-diazabicyclo[2,2,2,]octane. Especially preferable are tin octylate, dibutyltin diacetate, dibutyltin dilaurate, distannoxanes and like organotin compounds. Dibutyltin diacetate is suitable to use in the case where baking at low temperatures is required. The amount of curing catalyst to be used is usually about 0 to about 5 wt. % although variable depending on the kind thereof.

When the coating composition or the like comprising such ingredients is heated at a temperature of 60° to 180° C., preferably 80° to 140° C., isocyanate groups are regenerated from the blocked isocyanate groups in the presence or absence of the curing catalyst and react with hydroxyl groups, forming urethane bonds to give a three-dimensional crosslinked structure.

The present invention provides the following advantages.

(1) The self-crosslinking resins of the invention having both of a blocked isocyanate group and a hydroxyl group are usable to give single-pack coating compositions. This completely eliminates the cumbersome procedure required, for example, of conventional thermally curable polyurethane coating compositions of the two-pack type, i.e., the procedure of measuring out specified amounts of two liquids immediately before use, mixing the liquids and applying the mixture within a period of time (pot life) during which it remains fully flowable.

(2) Since there is no need to use polymerizable monomers or solvents having active hydrogen in the NCO-containing monomer polymerization reaction system, the polymer (A) can be prepared without involving any gelation.

(3) In reacting the blocking agent with the polymer (A) to obtain the polymer (C), the reaction system is heated at a particular optimum temperature necessary for the blocking agent to react with isocyanate groups, so that blocking agents, such as phenol or oxime compounds, which are prone to coloration at high temperatures are usable for blocking at a temperature of up to about 80° C. without necessitating heating to a high temperature and without entailing any likelihood of coloration. Moreover, the blocking agent used is low in dissociation temperature (up to 100° C.) and is therefore advantageous for preparing compositions which are curable at low temperatures. Even if having a high dissociation temperature, the blocking agent can be reacted with the polymer (A) with ease free of any gelation.

(4) Since the polymer (A), the hydroxyl-containing acrylic resin (B) and the polymer (C) are individually prepared before the resin (I) or (II) is prepared, the molecular weight and the number of functional groups of the desired resin can be determined readily.

(5) The self-crosslinking resins of the invention can be easily prepared by polymerization and grafting free of gelation, coloration or like objection, and can further be made curable at a low temperature.

The present invention will be described in greater detail with reference to the following examples, which nevertheless in no way limit the invention. The parts and percentages in the examples and comparative examples are all by weight.

EXAMPLE 1

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| | |
|---|---|
| m-Isopropenyl-α,α'-dimethylbenzyl isocyanate | 50 parts |
| n-Butyl acrylate | 30 parts |
| 2-Ethylhexyl acrylate | 20 parts |
| t-Butylperoxyisopropyl carbonate | 4 parts |

Subsequently, a mixture of 35 parts of xylene and 1.0 part of t-butylperoxyisopropyl carbonate was added dropwise to the resulting mixture over a period of 1 hour, followed by aging for 3 hours. (The reaction mixture will be referred to as a "polymer solution (A1)".) The resin solution obtained was 50% in nonvolatile content and was a colorless transparent liquid. The solution was D in Gardner viscosity (as measured by a Gardner bubble viscometer at 25° C., the same as hereinafter), about 6000 in weight average molecular weight and 100 g/1000 g resin in isocyanate value.

Preparation of hydroxyl-containing acrylic resin (B)

Xylene (65 parts) was placed into a reactor equipped with a stirrer, reflux condenser and thermometer, and maintained at 120° C. by heating. The following mixture was added dropwise to the xylene over a period of 3 hours.

| n-Butyl methacrylate | 39 parts |
| --- | --- |
| Styrene | 20 parts |
| 2-Ethylhexyl methacrylate | 15 parts |
| 2-Hydroxyethyl acrylate | 25 parts |
| Acrylic acid | 1 part |
| 2,2'-Azobisisobutyronitrile | 4 parts |

Subsequently, a mixture of 35 parts of xylene and 0.5 part of 2,2'-azobis(2,4-dimethylvaleronitrile) was added dropwise to the resulting mixture over a period of 1 hour, followed by aging for 3 hours. (The reaction mixture will be referred to as a "polymer solution (B1)".)

The resin solution obtained was a colorless transparent liquid. The solution was O in Gardner viscosity, and the resin obtained was 120.9 ml KOH/g resin in hydroxyl value, 7.7 mg KOH/g resin in acid value and about 10000 in weight average molecular weight.

Preparation of self-crosslinking resin (I)

Into a reactor equipped with a stirrer, reflux condenser and thermometer were placed 476 parts of the polymer solution (A1) and 524 parts of the polymer solution (B1), which were stirred at room temperature (25° C.) for 15 minutes. The isocyanate value of the resulting mixture varnish measured was 47.6 g/1000 g resin. (This value was taken as the initial isocyanate value.) The mixture was then maintained at 40° C. with heating and stirring for a further reaction for about 3 hour. When the isocyanate value decreased to 45.8 g/1000 g resin, 52.2 parts of methyl ethyl ketoxime was added to the mixture, which was thereafter aged at 60° C. for 2 hours. (The reaction mixture will be referred to as a "self-crosslinking resin (I-1)".)

The resin solution obtained was a slightly yellowish transparent liquid and S in Gardner viscosity. The resin solution was 52.0% in solids content, 57.9 mg KOH/g resin in hydroxyl value, 3.7 mg KOH/g resin in acid value, 45,8 g/1000 g resin in isocyanate value, 0.96 in NCO/OH ratio and about 16000 in weight average molecular weight.

The resin solution was stored at 30° C. for 1 month, but no increase was found in its viscosity.

EXAMPLE 2

Dibutyltin dilaurate was added to the self-crosslinking resin (I-1) in an mount of 0.5 part per 100 parts of solids of the resin (I-1).

EXAMPLE 3

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| m-Isopropenyl-α,α'-dimethylbenzyl isocyanate | 40 parts |
| --- | --- |
| Styrene | 20 parts |
| Ethyl acrylate | 35 parts |
| Methyl methacrylate | 5 parts |
| t-Butylperoxyisopropyl carbonate | 3 parts |

Subsequently, a mixture of 35 parts of xylene and 1.0 part of t-butylperoxyisopropyl carbonate was added dropwise to the resulting mixture over a period of 1 hour, followed by aging for 3 hours. (The reaction mixture will be referred to as a "polymer solution (A2)".) The resin solution obtained had a nonvolatile content of 50% and was a colorless transparent liquid. The solution was F in Gardner viscosity, about 9000 in weight average molecular weight and 80 g/1000 g resin in isocyanate value.

Preparation of hydroxyl-containing acrylic resin (B)

Xylene (65 parts) was placed into a reactor equipped with a stirrer, reflux condenser and thermometer, and maintained at 120° C. with heating. The following mixture was added dropwise to the xylene over a period of 3 hours.

| n-Butyl methacrylate | 48 parts |
| --- | --- |
| Styrene | 20 parts |
| 2-Ethylhexyl methacrylate | 15 parts |
| 2-Hydroxyethyl methacrylate | 15 parts |
| Methacrylic acid | 2 parts |
| 2,2'-Azobisisobutyronitrile | 1.0 part |

Subsequently a mixture of 35 parts of xylene and 0.5 part of 2,2'-azobis(2,4-dimethylvaleronitrile) was added dropwise to the resulting mixture over a period of 1 hour, followed by aging for 3 hours. (The reaction mixture will be referred to as a "polymer solution (B2)".)

The resin solution obtained was a colorless transparent liquid and S in Gardner viscosity. The resin obtained was 64.7 mg KOH/g resin in hydroxyl value, 13.0 mg KOH/g resin in acid value and about 18000 in weight average molecular weight.

Preparation of self-crosslinkng resin (I)

Into a reactor equipped with a stirrer, reflux condenser and thermometer were placed 377 parts of the polymer solution (A2) and 623 parts of the polymer solution (B2), which were then stirred at room temperature (25° C.) for 15 minutes. The isocyanate value of the resulting varnish measured was 30.1 g/1000 g resin. (This value was taken as the initial isocyanate value.) The mixture was then maintained at 40° C. with heating and stirring for a further reaction for about 3.5 hours. When the isocyanate value decrease to 29.1 g/1000 g resin, 22.2 parts of methanol was added to the mixture, followed by aging at 60° C. for 4 hours. (The reaction mixture will be referred to as a "self-crosslinking resin (I-2)".)

The resin solution obtained was a slightly yellowish transparent liquid and V in Gardner viscosity. The resin solution was 50.0% in solids content, 37.8 mg KOH/g resin in hydroxyl value, 3.7 mg KOH/g resin in acid value, 29.1 g/1000 g resin in isocyanate value, 0.97 in NCO/OH ratio and about 27000 in weight average molecular weight.

The resin solution was stored at 30° C. for 1 month but no increase was found in its viscosity.

EXAMPLE 4

Dibutyltin dilaurate was added to the self-crosslinking resin (I-2) in an amount of 1.0 part per 100 parts of solids of the resin (I-2).

EXAMPLE 5

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| m-Isopropenyl-α,α'-dimethylbenzyl isocyanate | 60 parts |
| --- | --- |
| n-Butyl acrylate | 35 parts |
| 2-Ethylhexyl acrylate | 5 parts |
| t-Butylperoxyisopropyl carbonate | 4 parts |

Subsequently, a mixture of 35 parts of xylene and 1.0 part of t-butylperoxyisopropyl carbonate was added dropwise to the resulting mixture, followed by aging for 3 hours. (The reaction mixture will be referred to as a "polymer solution (A3)".) The resin solution obtained was B in Gardner viscosity, about 6000 in weight average molecular weight and 120.0 g/1000 g resin in isocyanate value.

Preparation of hydroxyl-containing acrylic resin (B)

Xylene (65 parts) was placed into a reactor equipped with a stirrer, reflux condenser and thermometer, and maintained at 120° C. with heating. The following mixture was added dropwise to the xylene over a period of 3 hours.

| | |
|---|---|
| n-Butyl methacrylate | 50 parts |
| Styrene | 10 parts |
| Placcel FM-3 (product of Daicel Chemical Industries Ltd.) | 25 parts |
| 2-Hydroxyethyl acrylate | 15 parts |
| 2,2'-Azobisisobutyronitrile | 3.0 parts |

Subsequently, a mixture of 35 parts of xylene and 0.5 part of 2,2'-azobis(2,4-dimethylvaleronitrile) was added dropwise to the resulting mixture over a period of 1 hour, followed by aging for 3 hours. (The reaction mixture will be referred to as a "polymer solution (B3)".) The resin solution obtained was a colorless transparent liquid and O in Gardner viscosity. The resin obtained was 102.2 mg KOH/g resin in hydroxyl value and about 13000 in weight average molecular weight.

Preparation of self-crosslinking resin (II)

Into a reactor equipped with a stirrer, reflux condenser and thermometer were placed 389 parts of the polymer solution (A3) and 45.5 parts of methyl ethyl ketoxime, which were then heated and stirred at 60° C. for 2 hours (vinyl polymer (C)). To the product was added 611 parts of the polymer solution (B3), and the mixture was aged at 40° C. for 4 hours until no free isocyanate groups remained. Subsequently, 4.6 parts of methyl ethyl ketoxime was added to the resulting mixture. (The reaction mixture will be referred to as a "self-crosslinking resin (II-1)".)

The resin solution obtained was a slightly yellowish transparent liquid and U in Gardner viscosity (as measured by a Gardner bubble viscometer at 25° C.). The resin solution was 51.9% in solids content, 57.2 mg KOH/g resin in hydroxyl value, 41.5 g/1000 g resin in isocyanate value, 0.97 in NCO/OH ratio and about 19000 in weight average molecular weight. The solution was stored at 30° C. for 1 month, but no increase was found in its viscosity.

EXAMPLE 6

Dibutyltin diacetate was added to the self-crosslinking resin (II-1) in an amount of 0.9 part per 100 parts of solids of the resin (II-1).

COMPARATIVE EXAMPLE 1

Xylene (65 parts) was placed into a reactor equipped with a stirrer, reflux condenser and thermometer, and maintained at 80° C. by heating. It was then attempted to add the following mixture dropwise to the xylene over a period of 6 hours.

| | |
|---|---|
| m-Isopropenyl-α,α'-dimethylbenzyl isocyanate | 30 parts |
| n-Butyl methacrylate | 35 parts |
| Methyl methacrylate | 18 parts |
| 2-Hydroxyethyl acrylate | 17 parts |
| α,α'-Azobisisobutyronitrile | 3 parts |

However, the mixture gelled about 5 hours after the start of the addition.

COMPARATIVE EXAMPLE 2

Xylene (65 parts) was placed into a reactor equipped with a stirrer, reflux condenser and thermometer, and maintained at 120° C. by heating. The following mixture was added dropwise to the xylene over a period of 3 hours.

| | |
|---|---|
| m-Isopropenyl-α,α'-dimethylbenzyl isocyanate as blocked with methyl ethyl ketoxime | 43 parts |
| n-Butyl methacrylate | 35 parts |
| Methyl methacrylate | 18 parts |
| 2-Hydroxyethyl acrylate | 17 parts |
| t-Butylperoxy-2-ethyl hexanoate | 4 parts |

Subsequently, a mixture of 35 parts of xylene and 0.5 part of t-butylperoxy-2-ethyl hexanoate was added dropwise to the resulting mixture, followed by aging for 3 hours.

The resin solution obtained was a liquid colored reddish brown and had an increased viscosity.

COMPARATIVE EXAMPLE 3

A clear coat composition was prepared by mixing together 610 parts of the polymer solution (B3), 487.5 parts of "80% Coronate 2507" (blocked HDI (hexamethylene diisocyanate) manufactured by Nippon Polyurethane Kogyo Co., Ltd.) and 0.5 PHR, based on solids, of dibutyltin dilaurate. The composition was satisfactory in storage stability.

COMPARATIVE EXAMPLE 4

A clear coat composition was prepared by mixing together 610 parts of the polymer solution (B3), 487.5 parts of "80% Coronate 2507" (blocked HDI (hexamethylene diisocyanate) manufactured by Nippon Polyurethane Kogyo Co., Ltd.) and 0.9 PHR, based on solids, of dibutyltin dilaurate. The composition was satisfactory in storage stability.

The solutions or compositions of Examples 1 to 6 and Comparative Example 3 were tested for storage stability, and also applied to tinplate to a thickness, as dried, of about 40 μm, baked at 120° C. or 140° C. for 30 minutes and thereafter checked for gel fraction and xylol wipeability. Table 1 shows the results. The test methods wee as follows.

Storage stability

The sample was stored at 30° C. for 1 month, and if the resulting increase in viscosity was within 2-stage change in Gardner viscosity, the result was evaluated as "good".

Gel fraction

The coating removed form the tinplate was subjected to extraction in a solvent mixture of acetone and methanol (1:1) under reflux, and the weight ratio of the resulting coating to the coating before extraction was determined.

Xylol wipeability

The coating was forcibly rubbed with a piece of gauze wet with xylol reciprocatingly 20 times over a stroke length of 10 cm and thereafter checked for scratches or hazing. The result was evaluated according to the following crieteria.

A: No scratches or hazing

B: Some scratches or slight hazing

C: Many scratches or considerable hazing

TABLE 1

|  | Curing catalyst | Storage stability | Gel fraction (baking at 120° C./ 140° C. | Xylol wipe-ability |
| --- | --- | --- | --- | --- |
| Example 1 | None | Good | 92/95 | A |
| Example 2 | DBTDL | Good | 96/97 | A |
| Example 3 | None | Good | 92/94 | A |
| Example 4 | DBTDL | Good | 97/97 | A |
| Example 5 | None | Good | 93/97 | A |
| Example 6 | DBTDA | Good | 97/98 | A |
| Comp. Ex. 3 | DBTDL | Good | 38/79 | C |

In the above table, DBTDL stands for dibutyltin dilaurate, and DBTDA for dibutyltin diacetate.

The compositions of Example 6 and Comparative Example 4 were applied to tinplate to a thickness, as dried, of about 40 μm, baked at 100° C. for 30 minutes and thereafter tested for gel fraction and xylol wipeability in the same manner as above. Table 2 shows the results.

TABLE 2

|  | Gel fraction | Xylol wipeability |
| --- | --- | --- |
| Example 6 | 95 | A |
| Comp. Ex. 4 | 0 | C |

We claim:

1. A process for preparing a self-crosslinking resin having a blocked isocyanate group and a hydroxyl group in the molecule, said process comprising reacting some of the free isocyanate groups of a vinyl polymer (A) having at least two free isocyanate groups in the molecule with some of the hydroxyl groups of an acrylic resin (B) having at least two hydroxyl groups in the molecule, and subsequently reacting a blocking agent with all of the remaining free isocyanate groups.

2. A process as defined in claim 1, wherein the vinyl polymer (A) is a polymer prepared from at least one isocyanate-containing vinyl monomer selected from the group consisting of 2-isocyanate ethyl methacrylate, m-isopropenyl-α,α'-dimethylbenzyl isocyanate and an adduct of 2-hydroxyethyl acrylate with isophorone diisocyanate.

3. A process as defined in claim 1, wherein the self-crosslinking resin is about 1000 to about 120000 in weight average molecular weight.

4. A process as defined in claim 1, wherein the self-crosslinking resin is about 25 to about 250 mg KOH/g in hydroxyl value and about 5 to about 250 g/1000 g in isocyanate value.

5. The process as defined in claim 2, wherein vinyl polymer (A) further comprises at least one other vinyl monomer.

6. A process for preparing a self-crosslinking resin having a blocked isocyanate group and a hydroxyl group in the molecule, comprising reacting some of the hydroxyl groups of an acrylic resin (B) having at least two hydroxyl groups in the molecule with all the free isocyanate groups of a vinyl polymer (C) having at least one free isocyanate group and at least one blocked isocyanate group in the molecule.

7. A process as defined in claim 6, wherein the vinyl polymer (C) is a partially blocked product of a polymer prepared from at least one isocyanate-containing vinyl monomer selected from the group consisting of 2-isocyanate ethyl methacrylate, m-isopropenyl-α,α'-dimethylbenzyl isocyanate and an adduct of 2-hydroxyethyl acrylate with isophorone diisocyanate.

8. A process as defined in claim 6, wherein the self-crosslinking resin is about 1000 to about 120000 in weight average molecular weight.

9. A process as defined in claim 6, wherein the self-crosslinking resin is about 25 to about 250 mg KOH/g in hydroxyl value and about 5 to about 250 g/1000 g in isocyanate value.

10. The process as defined in claim 7, wherein vinyl polymer (C) further comprises at least one other vinyl monomer.

* * * * *